US012548439B2

(12) United States Patent
Terasaki et al.

(10) Patent No.: US 12,548,439 B2

(45) Date of Patent: Feb. 10, 2026

(54) COMMUNICATION SYSTEM, STORAGE MEDIUM, AND COMMUNICATION METHOD

(71) Applicant: FURUKAWA ELECTRIC CO., LTD., Tokyo (JP)

(72) Inventors: Tomoaki Terasaki, Tokyo (JP); Kenichi Goto, Tokyo (JP); Yan Xie, Tokyo (JP); Ryotaka Miyamoto, Tokyo (JP); Masahiro Asami, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 301 days.

(21) Appl. No.: 18/184,285

(22) Filed: Mar. 15, 2023

(65) Prior Publication Data

US 2023/0316904 A1 Oct. 5, 2023

(30) Foreign Application Priority Data

Mar. 31, 2022 (JP) ................................ 2022-058020

(51) Int. Cl.

*G08G 1/00* (2006.01)
*G08G 1/017* (2006.01)
*G08G 1/04* (2006.01)

(52) U.S. Cl.

CPC ............... *G08G 1/04* (2013.01); *G08G 1/017* (2013.01)

(58) Field of Classification Search

CPC ............ G08G 1/04; G08G 1/017; G08G 1/00; H04W 4/021; H04W 4/44

USPC ........................................................... 701/23

See application file for complete search history.

(56) References Cited

U.S. PATENT DOCUMENTS

2020/0213226 A1* 7/2020 Zheng .................. H04L 45/036
2020/0221349 A1* 7/2020 Nakata .................. H04W 4/44

FOREIGN PATENT DOCUMENTS

JP 2002-232436 A 8/2002
JP 2014-3355 A 1/2014
JP 2015-207935 A 11/2015
JP 2019-106674 A 6/2019
JP 2021-22221 A 2/2021

OTHER PUBLICATIONS

IEEE Std 802.3™—2022, "IEEE Standard for Ethernet" IEEE Computer Society, 2022, 7,025 pages.
Japanese Office Action issued Jul. 9, 2024 in Japanese Patent Application No. 2022-058020, with machine-generated, unedited English translation, 5 pages.

* cited by examiner

*Primary Examiner* — Shardul D Patel

(74) *Attorney, Agent, or Firm* — Oblon, McClelland, Maier & Neustadt, L.L.P.

(57) ABSTRACT

A communication system includes a plurality of roadside units installed in respective areas that acquires travel information about a vehicle through radio communication, and a first terminal to which the plurality of roadside units is connected. The roadside units and the first terminal each include a routing processing unit, implemented by software. The routing processing unit performs a communication process in line with a routing table updated based on the travel information.

9 Claims, 10 Drawing Sheets

COMMUNICATION SYSTEM, STORAGE MEDIUM, AND COMMUNICATION METHOD

This application is based on and claims the benefit of priority from Japanese Patent Application No. 2022-058020, filed on 31 Mar. 2022, the content of which is incorporated herein by reference.

BACKGROUND OF THE INVENTION

Field of the Invention

The present invention relates to a communication system, a storage medium, and a communication method.

Related Art

There is a conventionally-known communication system relating to road-to-vehicle communication made between a vehicle and a roadside unit, for example. Patent Documents 1 and 2 are given as examples of documents relating to communication technology used in such a system. Patent Document 1 describes technology of making reservation so as to allocate radio resources from a base station in a time period when a vehicle passes through a service area offered from the base station from the intended travel path transmitted from the vehicle. Patent Document 2 describes technology of setting an optical path dynamically through a layer 1 or layer 2 between the first information processor communicably connected to a vehicle by radio and a different information processor highly likely to become communicable next by radio with the traveling vehicle. Non-Patent Document 1 describes technology relating to a connection scheme such as a LAN as a standard for communication technology used in a communication system.

Patent Document 1: Japanese Unexamined Patent Application, Publication No. 2014-3355

Patent Document 2: Japanese Unexamined Patent Application, Publication No. 2019-106674

Non-Patent Document 1: IEEE802.3

SUMMARY OF THE INVENTION

In a case of a traveling vehicle, in order not to interrupt communication, it is required to smoothly perform operation of switching a roadside unit as a communication counterpart. Furthermore, it is required to construct a system over a wide area, and to operate and manage the said system. Hence, reducing infrastructure costs is desired. Non-Patent Document 1 does not describe the technology for smoothly switching between roadside units to communicate with a vehicle, or the technology to reduce costs for the infrastructure. Moreover, while the technology in Patent Document 1 or Patent Document 2 makes it possible to set communication between a roadside unit and a vehicle in advance, such technology still has room for improvement in terms of reduction in installation costs.

The present invention is intended to provide a communication system, a storage medium, and a communication method capable of smoothly switching between roadside units that makes radio communication with a traveling vehicle while reducing infrastructure costs.

The present invention relates to a communication system including: a plurality of roadside units installed in respective areas that acquires travel information about a vehicle through radio communication; and a terminal to which the plurality of roadside units is connected. The roadside units and the terminal each include a routing processing unit implemented by software. The routing processing unit performs a communication process in line with a routing table updated based on the travel information.

The routing processing unit may predict the roadside unit belonging to the plurality of roadside units set in the intended area where the vehicle is predicted to travel based on the travel information, and update the routing table based on results of the prediction.

The roadside unit may further include a communication state setting unit. To coincide with timing set based on the travel information, the communication state setting unit may allocate radio resources to the vehicle and set a state where the roadside unit is communicable with the terminal before the vehicle enters a communicable area communicable with the vehicle if the roadside unit itself is predicted to be the roadside unit set in the intended area.

The traveling information may include positional information, velocity information, destination information, and steering information about the vehicle.

The communication system may further include a plurality of ONUs connected to the terminal, and the terminal may be an OLT and may form a PON access system together with a plurality of the ONUs.

The roadside unit may acquire identification information of the vehicle and determine from the identification information whether the vehicle is a route-set vehicle for which its destination is determined in advance. If the vehicle is determined to be a route-set vehicle, the roadside unit may predict two or more of the plurality of roadside units installed in the intended area where the vehicle is to pass through before arriving at its destination of the route-set vehicle, and can set a communication path between each of the two or more predicted roadside units and the terminal by updating the routing table based on the prediction.

The present invention also relates to a communication method executed by a communication system including a plurality of roadside units installed in respective areas, and a terminal to which the plurality of roadside units is connected. The method includes: a travel information acquisition step, of acquiring travel information about a vehicle through radio communication; and a communication processing step where the routing processing unit implemented by software on each of the roadside units and the terminal performs a communication process in line with the routing table updated based on the travel information.

The present invention also relates to a non-transitory computer-readable storage medium storing a program where a computer incorporated in the communication system to execute a function. The communication system includes a plurality of roadside units installed in respective areas, and a terminal to which the plurality of roadside units is connected. The function includes: a travel information acquisition function, acquiring travel information about the vehicle through radio communication; and a communication processing function, where a routing processing unit implemented by software on each of the roadside units, and the terminal performs a communication process in line with the routing table updated based on the According to the present invention, it is possible to smoothly switch between roadside units to make radio communication with a traveling vehicle while also reducing infrastructure costs.

DETAILED DESCRIPTION OF THE INVENTION

Figure 1:
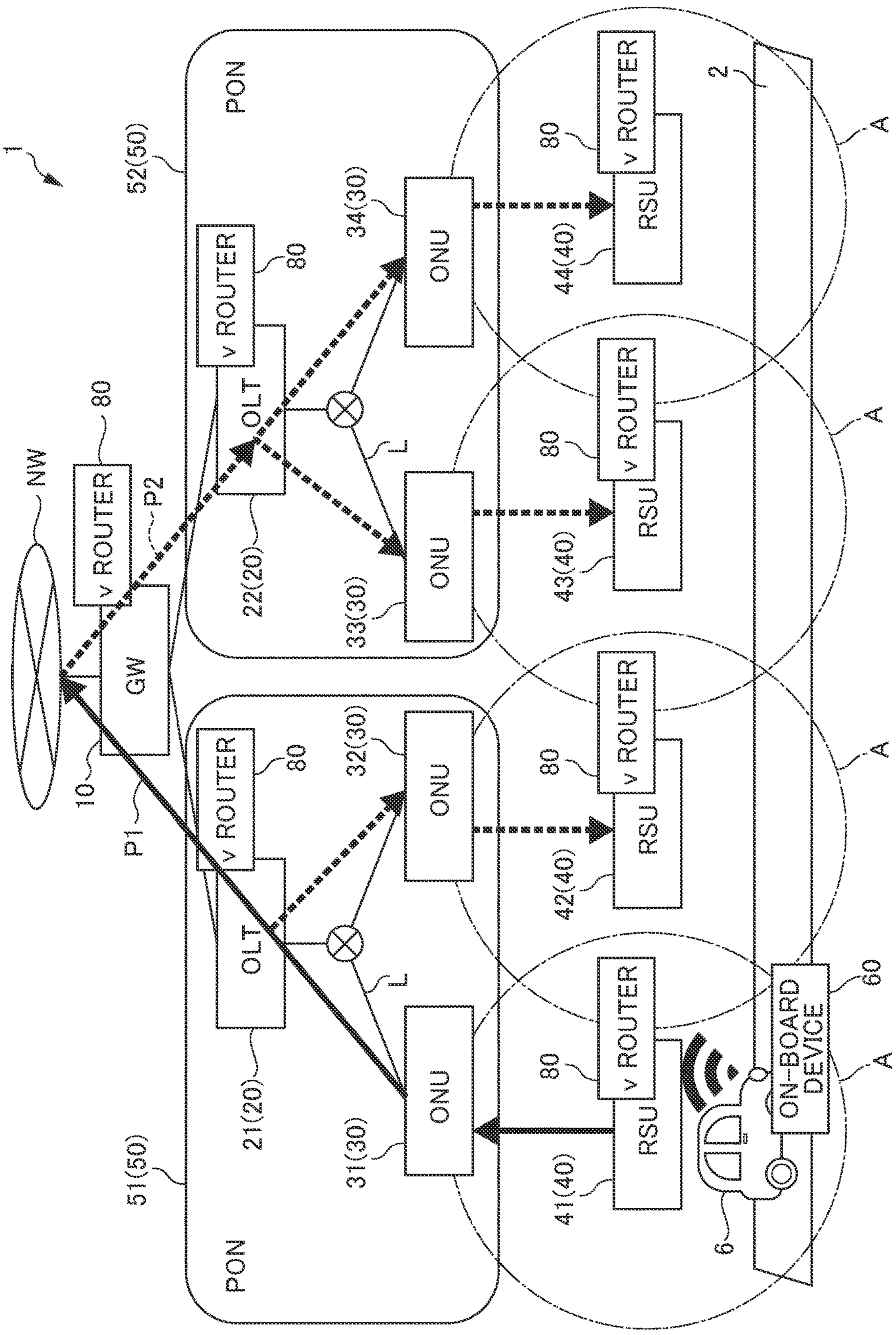
FIG. 1 is a schematic view showing a communication system according to an embodiment of the present invention.

An embodiment of the present invention will be described below by referring to the drawings. However, the embodiment described below is not intended to limit the present invention. In each of the drawings referred to in the following description, shapes, sizes, and positional relationships are schematically illustrated only to an extent at which the substance of the present disclosure can be understood. Namely, the present invention is not limited only to the shapes, sizes, and positional relationships illustrated in each drawing.

An overall configuration of a communication system 1 according to an embodiment of the present invention will be described by referring to FIG. 1. FIG. 1 is a schematic view showing the communication system 1 according to the present embodiment.

The communication system 1 is a system for making road-to-vehicle communication between a roadside unit 40 installed on a road 2 and a vehicle 6 stopping or traveling on the road 2. As shown in FIG. 1, the communication system 1 includes a gateway 10 connected to a network communication grid NW, a plurality of first terminals 20, a plurality of second terminals 30, and a plurality of roadside units 40 installed on the road 2.

The roadside unit 40 is also known as RSU, for example. The roadside unit 40 is installed around (along a side of) the road 2, for example. The roadside unit 40 makes radio communication with the vehicle 6 to provide vehicle-to-everything (V2X) communication service including vehicle-to-infrastructure (V2I) and vehicle-to-network (V2N).

In the communication system 1 shown in FIG. 1, roadside units 41 to 44 corresponding to the plurality of roadside units 40 that are spaced from each other in such a manner that respective communicable areas A communicable by radio with the vehicle 6 overlap each other. The roadside units 41 to 44 acquire vehicle information described later from the vehicle 6 by making radio communication with the vehicle 6 traveling in their respective communicable areas A, and transmit the acquired vehicle information to the second terminal 30.

The second terminal 30 is an optical network unit (ONU), for example. The second terminal 30 connects a line L and the roadside unit 40 to each other. The line L is a communication line formed of an optical fiber, for example. In the communication system 1 shown in FIG. 1, each of second terminals 31 to 34 corresponding to a plurality of the second terminals 30 is connected to one roadside unit 40. Specifically, the second terminal 31 is connected to a roadside unit 41, the second terminal 32 is connected to a roadside unit 42, the second terminal 33 is connected to a roadside unit 43, and the second terminal 34 is connected to a roadside unit 44.

The first terminal 20 is an optical line terminal (OLT), for example. The first terminal 20 connects the line L and the gateway 10 to each other. In the communication system 1 shown in FIG. 1, each of first terminals 21 and 22 corresponding to a plurality of the first terminals 20 is connected to two or more second terminals 30 through the line L to form a PON access system 50 using a passive optical network (PON). In the example shown in FIG. 1, a PON access system 51 is configured using the first terminal 21, the second terminals 31 and 32, and a PON access system 52 is configured using the first terminal 22, the second terminals 33 and 34. While not shown in FIG. 1, the second terminals 30 amounting to a number of equal to or greater than about 6000 is connectable to one first terminal 20, for example.

The gateway 10 connects a plurality of the PON access systems 50 and the network communication grid NW to each other.

As shown in FIG. 1, in the communication system 1, the gateway 10, the first terminal 20, and the roadside unit 40 each include a virtual router (v router) 80. Thus, the gateway 10, the first terminal 20, and the roadside unit 40 each have a routing function implemented by software. In response to receiving data, each of the gateway 10, the first terminal 20, and the roadside unit 40 is caused by this routing function to transfer the data to a destination address by referring to a routing table.

As shown in FIG. 1, if the vehicle 6 in a communicable area A able to communicate with the roadside unit 41, is traveling toward the roadside unit 42, for example, it is required to perform a process of switching the roadside unit 40 to make radio communication with the vehicle 6 from the roadside unit 41 to the roadside unit 42 (this process will be called a handover process). When the vehicle 6 goes out of the communication area A in which the vehicle 6 can communicate with the roadside unit 41 before performing the handover process of the roadside unit 40 for radio communication, the communication is disconnected. The handover process is required to be performed more smoothly, particularly if the vehicle 6 travels at a higher speeds or if the communicable area A, communicable with the roadside unit 40 is smaller. In recent years, transition to communication system such as the fifth generation mobile communication system (5G) where the range of communicable area A is relatively smaller, has increased the demand for technology of performing the handover process smoothly while reliably avoiding interruptions of communication. Moreover, a system is constructed over a wide area in many cases of road-to-vehicle communication. While not shown in FIG. 1, a large number of the PON access systems 50 or a network topology different from the PON access system 50 may be mixed in presence. This causes burdensome work and raises costs for maintenance and management of the communication system 1. In response to this, the communication system 1 according to the present embodiment allows the handover process to be performed smoothly while reducing infrastructure costs.

Figure 2:
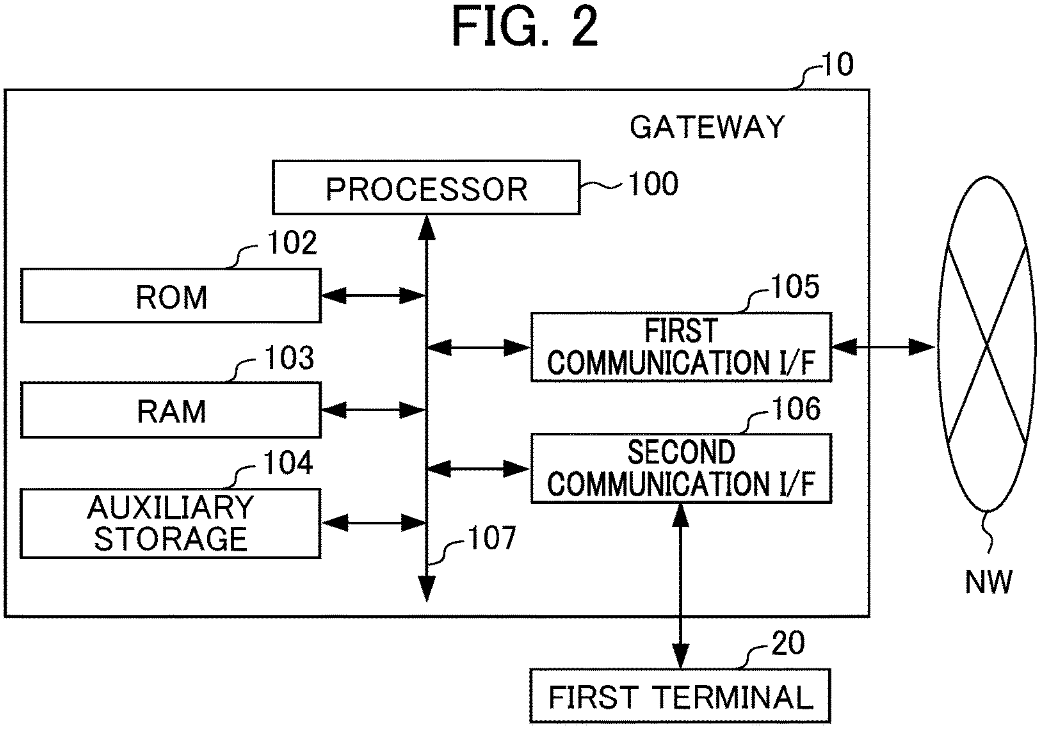
FIG. 2 is a block diagram showing a hardware configuration of a gateway according to an embodiment of the present invention.

The following describes an example of a hardware configuration incorporated in the communication system 1. An example of a hardware configuration of the gateway 10 will be described next. FIG. 2 is a block diagram showing the hardware configuration of the gateway 10.

As an example, the gateway 10 includes a processor 100, a read-only memory (ROM) 102, a random-access memory (RAM) 103, an auxiliary storage 104, a first communication interface (I/F) 105, and a second communication I/F 106. These units are connected to each other through a bus 107 and others.

The processor 100 corresponds to a core unit of a computer responsible for processes including calculation and control required for the operation of the gateway 10. For example, the processor 100 is a central processing unit (CPU), a micro processing unit (MPU), a system on a chip (SoC), a digital signal processor (DSP), a graphics processing unit (GPU), a vision processing unit (VPU), an application-specific integrated circuit (ASIC), a programmable logic device (PLD), or a field-programmable gate array (FPGA). Alternatively, the processor 100 is configured by combining two or more of these units. The processor 100 controls each unit in order to fulfill various functions of the gateway 10 on the basis of programs such as firmware, system software, and application software stored in the ROM 102 or the auxiliary storage 104, for example. The processor 100 performs processes described later on the basis of these programs. Some or all of these programs may be incorporated into a circuit in the processor 100.

The ROM 102 and the RAM 103 correspond to main storages of the computer including the processor 100 as a core. The ROM 102 is a nonvolatile memory used exclusively for reading of data. For example, the ROM 102 stores the firmware of the above-described programs. The ROM 102 further stores data and others used by the processor 100 in performing various types of processes. The RAM 103 is a memory used for reading and writing of data. The RAM 103 is used as a work area, for example, in which data temporarily used by the processor 100 in performing various types of processes is stored. Typically, the RAM 103 is a volatile memory.

The auxiliary storage 104 corresponds to an auxiliary storage of the computer including the processor 100 as a core. For example, the auxiliary storage 104 is an electric erasable programmable read-only memory (EEPROM), a hard disk drive (HDD), or a flash memory. For example, the auxiliary storage 104 stores the system software and the application software of the above-described programs. The auxiliary storage 104 further stores data used by the processor 100 in performing various types of processes, data generated by implementation of the processes by the processor 100, various types of set values, and others. The auxiliary storage 104 stores positional information about each roadside unit 40 in the communication system 1. The auxiliary storage 104 stores software for giving a routing function to the device.

The first communication I/F 105 is an interface for the gateway 10 to make communication through the network communication grid NW and others.

The second communication I/F 106 is an interface for the gateway 10 to make communication through the PON access system 50 and others. The gateway 10 connects the network communication grid NW and the PON access system 50 to each other using the first communication I/F 105 and the second communication I/F 106.

The bus 107 includes a control bus, an address bus, a data bus, and others, and is used for carrying signals transferred between the units of the gateway 10.

Figure 3:
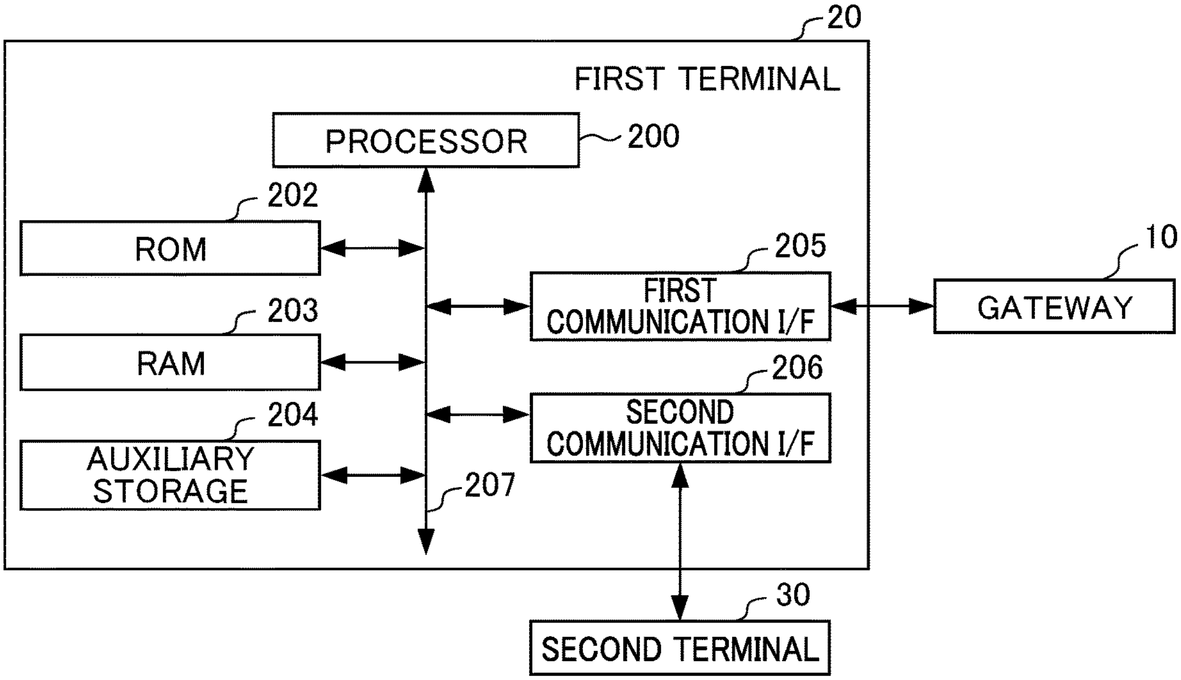
FIG. 3 is a block diagram showing a hardware configuration of a first terminal according to an embodiment of the present invention.

An example of a hardware configuration of the first terminal 20 will be described next. FIG. 3 is a block diagram showing the hardware configuration of the first terminal 20.

As an example, the first terminal 20 includes a processor 200, a ROM 202, a RAM 203, an auxiliary storage 204, a first communication I/F 205, and a second communication I/F 206. These units are connected to each other through a bus 207 and others. The processor 200, the ROM 202, the RAM 203, the auxiliary storage 204, and the bus 207 of the first terminal 20 have configurations similar to those of the above-described gateway 10 given the same names, so that descriptions thereof will be omitted.

The first communication I/F 205 is an interface for the first terminal 20 to make communication through the gateway 10, the network communication grid NW, and others.

The second communication I/F 206 is an interface for the first terminal 20 to make communication through the line L and others. The first terminal 20 connects the line L and the network communication grid NW to each other using the first communication I/F 205 and the second communication I/F 206.

Figure 4:
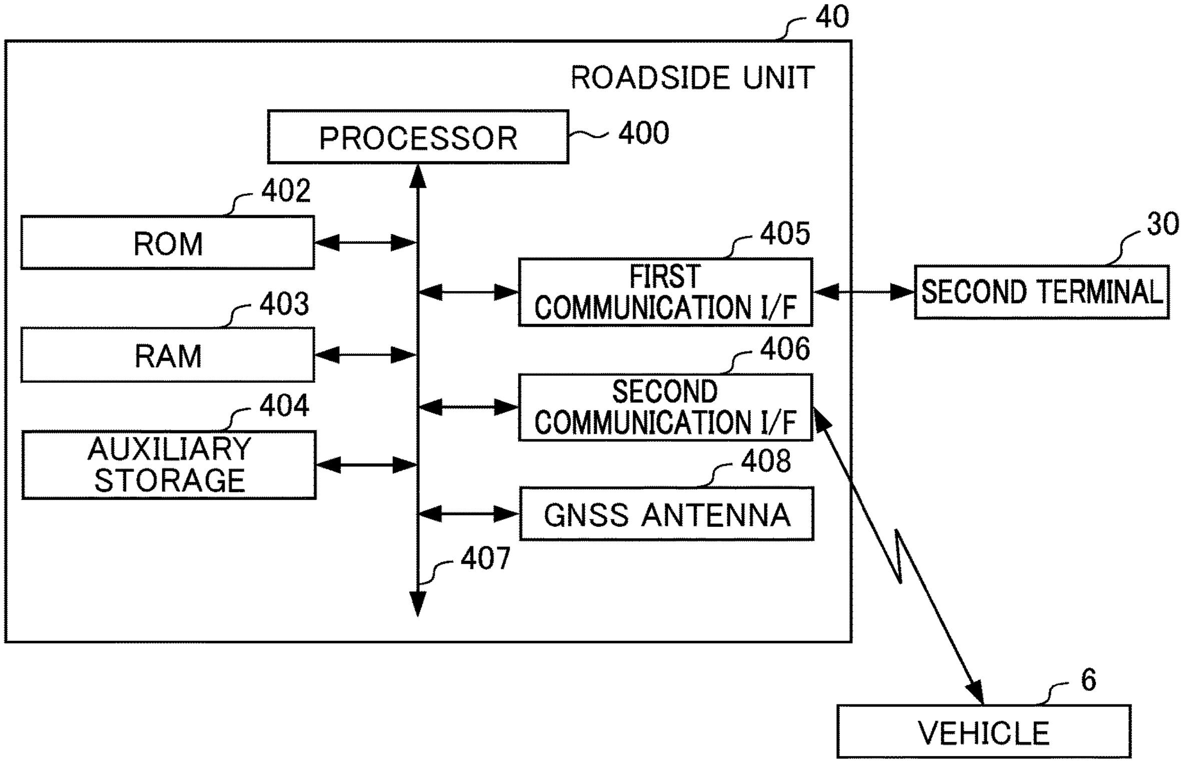
FIG. 4 is a block diagram showing a hardware configuration of a roadside unit according to an embodiment of the present invention.

An example of a hardware configuration of the roadside unit 40 will be described next. FIG. 4 is a block diagram showing the hardware configuration of the roadside unit 40.

As an example, the roadside unit 40 includes a processor 400, a ROM 402, a RAM 403, an auxiliary storage 404, a first communication I/F 405, a second communication I/F 406, and a GNSS antenna 408. These units are connected to each other through a bus 407 and others. The processor 400, the ROM 402, the RAM 403, the auxiliary storage 404, and the bus 407 of the roadside unit 40 have configurations similar to those of the above-described functional blocks of the gateway 10 and those of the first terminal 20 given the same names, so that descriptions thereof will be omitted.

The first communication I/F 405 is an interface for the roadside unit 40 to make communication through the PON access system 50. The roadside unit 40 connects to and communicates with the second terminal 30 through the first communication I/F 405. By doing so, the roadside unit 40 connects to the network communication grid NW through the first communication interface I/F 405, the second terminal 30, the line L, the first terminal 20, and the gateway 10.

The second communication interface I/F 406 is an interface for the roadside unit 40 to make V2X communication by radio with a peripheral device. The roadside unit 40 communicates through the second communication I/F 406 with the vehicle 6 traveling in the communicable area A, for example.

The GNSS antenna 408 receives a GNSS signal and others. The GNSS signal is transmitted from a navigation satellite forming a GNSS such as a global positioning system (GPS) or a quasi-zenith satellite system, for example. The processor 400 acquires positional information about the roadside unit 40 from the GNSS signal, for example. Then, the processor 400 instructs the first communication I/F 405 to transmit the positional information to a different roadside unit 40, the first terminal 20, the gateway 10, and others. In response to this instruction for transmission, the first communication I/F 405 transmits the positional information to the different roadside unit 40, the first terminal 20, and the gateway 10.

The transmitted positional information is stored in the respective auxiliary storages 404, 204, and 102. Moreover, the processor 400 adjusts time using a GNSS signal. Alternatively, the processor 400 may adjust time by another method such as a method using a network time protocol (NTP), for example.

Figure 5:
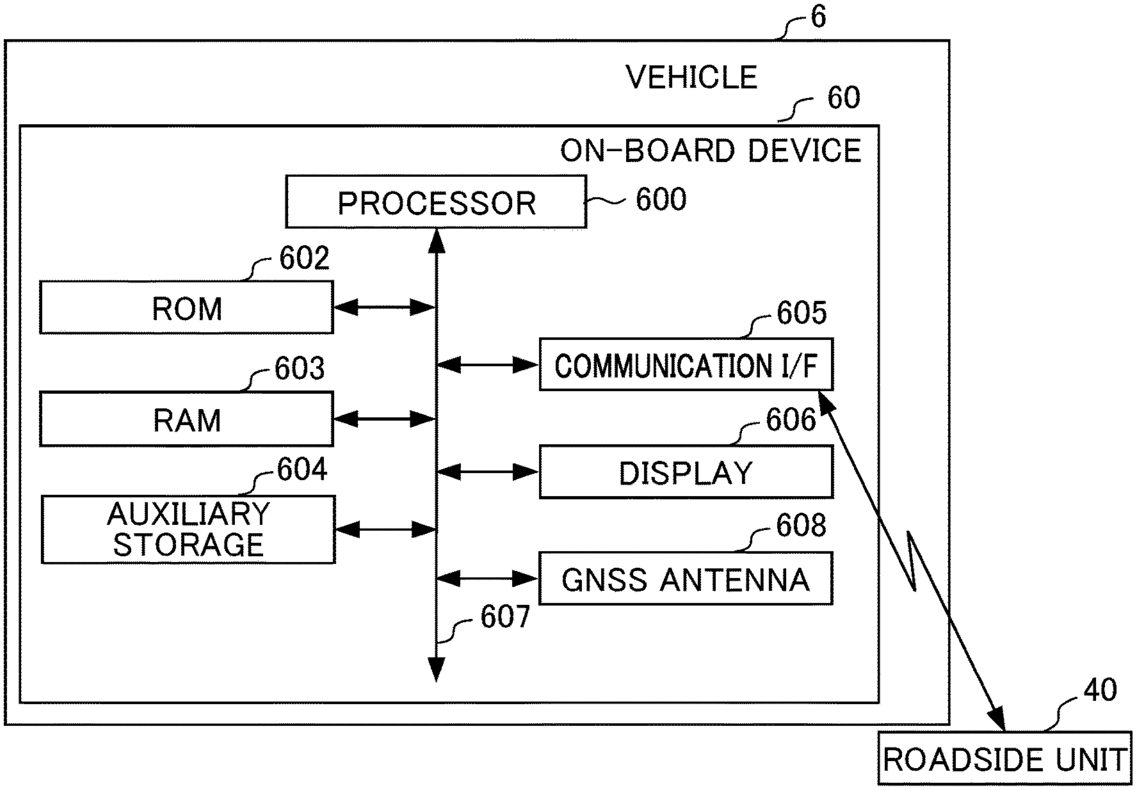
FIG. 5 is a block diagram showing a hardware configuration of a vehicle according to an embodiment of the present invention.

An example of a hardware configuration of the vehicle 6 will be described next. FIG. 5 is a block diagram showing the hardware configuration of the vehicle 6.

The vehicle 6 includes an on-board device 60. The on-board device 60 has a function of using car navigation, an intelligent transportation system (ITS), and V2X communication, for example. As an example, the on-board device 60 includes a processor 600, a ROM 602, a RAM 603, an auxiliary storage 604, a communication I/F 605, a display 606, and a GNSS antenna 608. These units are connected to each other through a bus 607 and others. The processor 600, the ROM 602, the RAM 603, the auxiliary storage 604, and the bus 607 of the on-board device 60 have configurations similar to those of the above-described functional blocks of the gateway 10 and others, so that descriptions thereof will be omitted.

The communication I/F 605 is an interface for the vehicle 6 to communicate with the roadside unit 40 through V2X communication, for example. The vehicle 6 connects to the PON access system 50 and the network communication grid NW through the roadside unit 40.

The display 606 displays a screen for presenting various types of information to an operator of the vehicle 6. For example, the display 606 is a display such as a liquid crystal display or an organic electroluminescence (EL) display.

The GNSS antenna 608 receives a GNSS signal and others. The processor 600 receives positional information about the on-board device 60 from the GNSS signal, for example.

Figure 6:
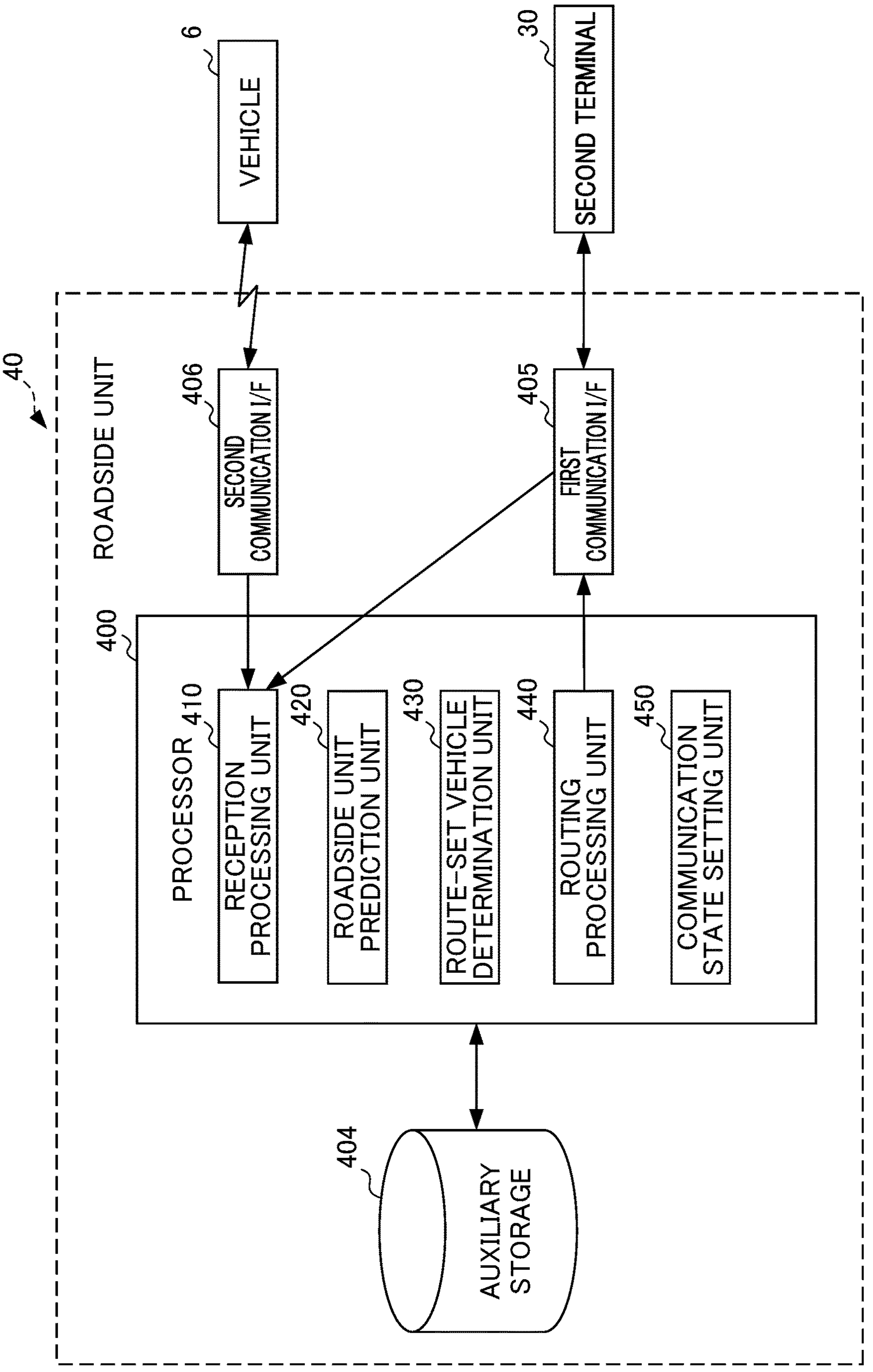
FIG. 6 is a functional block diagram of the roadside unit according to an embodiment of the present invention.

The following describes a functional configuration of the roadside unit 40 to make the communication system 1 perform road-to-vehicle communication and the handover process. FIG. 6 is a functional block diagram showing a part of the functional configuration of the roadside unit 40.

The road-to-vehicle communication by the roadside unit 40 is realized mainly by the processor 400. The processor 400 includes a reception processing unit 410, a roadside unit prediction unit 420, a route-set vehicle determination unit 430, a routing processing unit 440, and a communication state setting unit 450.

The reception processing unit 410 performs a process for receiving data from the vehicle 6 through the second communication I/F 406 and a process for receiving data from the second terminal 30 through the first communication I/F 405.

The reception processing unit 410 acquires vehicle information about the vehicle 6 traveling in the communicable area A by making radio communication through the second communication I/F 406, for example. Examples of the vehicle information acquired by the reception processing unit 410 include travel information and identification information about the vehicle 6. The travel information may include positional information, velocity information, destination information, information about a traveling-intended path, and steering information about a vehicle. Examples of the identification information include an MAC address and IPv6 of the on-board device 60, and license plate information. The vehicle information is acquired from the on-board device 60 belonging to the vehicle 6, for example.

The reception processing unit 410 further receives a routing table and vehicle information received by the roadside unit 40 different from its own roadside unit 40 through the first communication I/F 405, for example. Thus, the roadside unit 40 is configured to acquire vehicle information about the vehicle 6 traveling in the communicable area A, communicable with the current roadside unit 40 through the second communication I/F 406 and to acquire vehicle information about vehicle 6 traveling in a separate communicable area A communicable with the roadside unit 40 separate from the current roadside unit 40.

The roadside unit prediction unit 420 predicts the roadside unit 40 to communicate with the vehicle 6 (hereinafter called a communication-intended roadside unit) based on travel information acquired by the reception processing unit 410 and positional information about a different roadside unit 40 in the communication system 1 stored, for example, in the auxiliary storage 404. Thus, the roadside unit prediction unit 420 predicts the roadside unit 40 installed in an intended area where the vehicle 6 is predicted to travel. Specifically, the roadside unit prediction unit 420 predicts a traveling path for the vehicle 6 based on the travel information, and identifies the roadside unit 40 installed on a traveling path predicted using the predicted traveling path and the positional information about the other roadside unit 40. The roadside unit prediction unit 420 may predict the traveling path of vehicle using positional information, velocity information, steering information and others about the vehicle 6, or may predict the traveling path using positional information and destination information and others about the vehicle 6, for example. The roadside unit prediction unit 420 may predict the communication-intended roadside unit using a traveling path for the vehicle 6 registered with the on-board device 60. The roadside unit prediction unit 420 may further predict timing of when vehicle 6 enters the communicable area A communicable with a communication-intended roadside unit or the timing when vehicle 6 exits the current communicable area A. Moreover, by using the predicted timing of entry and exit of the vehicle 6, the roadside unit 40 and the communication-intended roadside unit may perform a process relating to handover before the instance in which a handover becomes necessary.

The route-set vehicle determination unit 430 determines whether the vehicle 6 is a route-set vehicle based on the identification information about the vehicle 6 acquired by the reception processing unit 410. The route-set vehicle is the vehicle 6 for which its destination is determined in advance. Examples of the route-set vehicle include a bus and a taxi.

If the route-set vehicle determination unit 430 determines that vehicle 6 with which radio communication is established is a route-set vehicle, the roadside unit prediction unit 420 predicts all roadside units 40 that are installed in an intended area where the route-set vehicle is predicted to pass through before arriving at its destination registered with the route-set vehicle, and determines these roadside units 40 to be communication-intended roadside units.

The routing processing unit 440 is implemented by software on the roadside unit 40. The routing processing unit 440 updates its own routing table based on the travel information acquired by the reception processing unit 410. Specifically, on the basis of the prediction results of the communication-intended roadside unit by the roadside unit prediction unit 420, the routing processing unit 440 updating the routing table of the routing processing unit 440 itself. The routing processing unit 440 updates the routing table containing an address of the communication-intended roadside unit registered as a destination address, for example.

Furthermore, based on the routing protocol, the routing processing unit 440 transmits its own updated routing table together with the vehicle information to different roadside unit 40, the first terminal 20, the gateway 10, and others through second terminal 30. As a result, respective routing tables of other roadside unit 40, the first terminal 20, the gateway 10, and others are updated based on its own updated routing table. Thus, the routing processing unit 440 performs a communication process in line with the routing table updated based on travel information.

The communication state setting unit 450 receives vehicle information transmitted from different roadside unit 40 through the PON access system 50 for example, and controls communication in such a manner that its own roadside unit 40 becomes communicable with vehicle 6 to coincide with timing set based on vehicle information received. As an example, by referring to the timing when vehicle 6 enters the communicable area A, for example, the communication state setting unit 450 allocates radio resources for the roadside unit 40 and sets a state where the roadside unit 40 is communicable with the PON access system 50 and others before the vehicle 6 enters the communicable area A.

Figure 7:
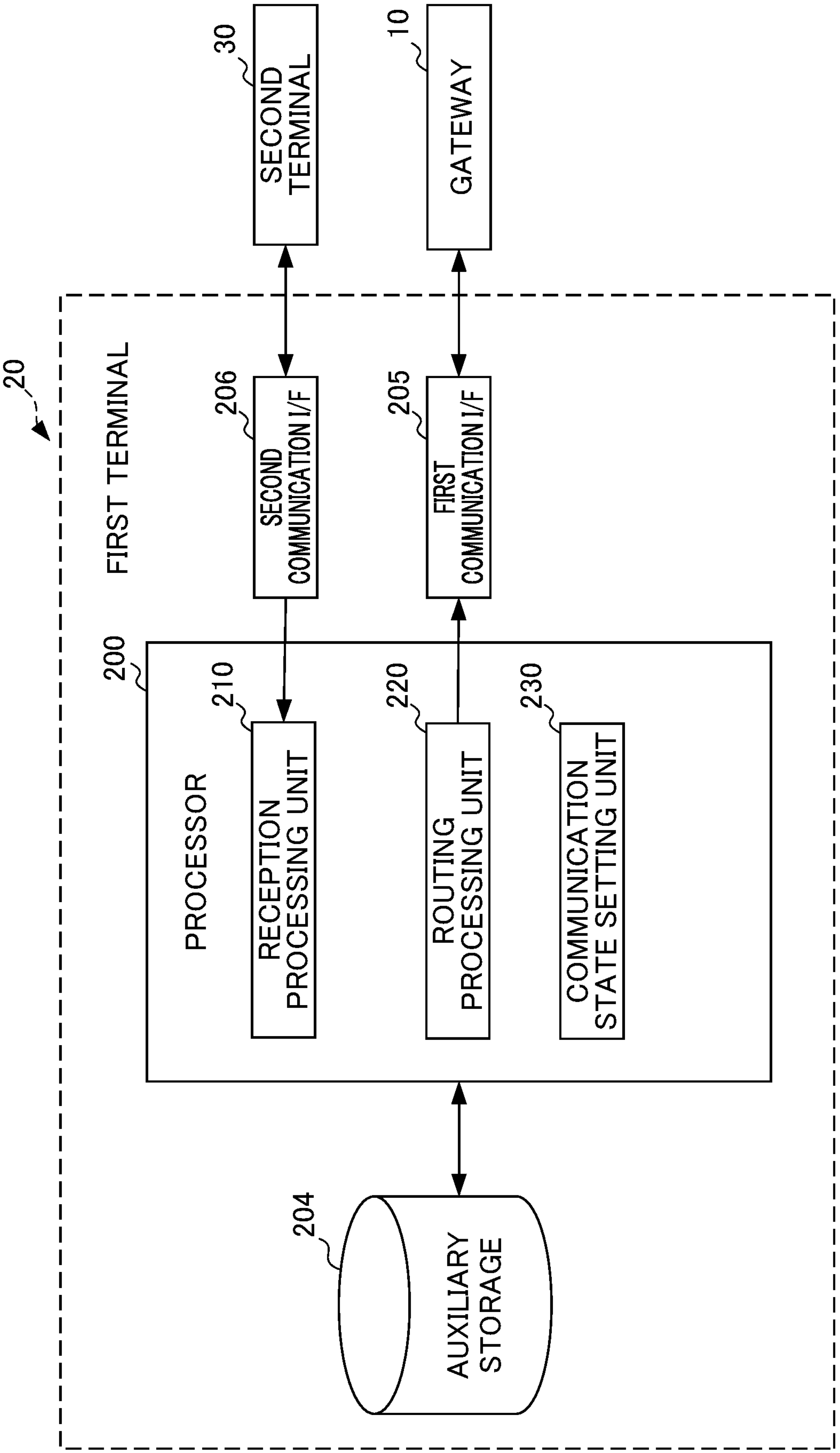
FIG. 7 is a functional block diagram of the first terminal according to an embodiment of the present invention.

The following describes a functional configuration of the first terminal 20 for performing the handover process for road-to-vehicle communication by the communication system 1. FIG. 7 is a functional block diagram showing a part of the functional configuration of the first terminal 20.

The processor 200, responsible for various controls over the first terminal 20 includes a reception processing unit 210, a routing processing unit 220, and a communication state setting unit 230.

The reception processing unit 210 performs a process of receiving a routing table containing an address of a communication-intended roadside unit registered as a destination address, and vehicle information.

The routing processing unit 220 is implemented by software on the first terminal 20. The routing processing unit 220 updates a routing table belonging to the routing processing unit 220 itself using the routing table received by the reception processing unit 210. Specifically, the routing processing unit 220 makes an update to the routing table containing the address of the communication-intended roadside unit registered as a destination address.

The routing processing unit 220 performs a process of transmitting the vehicle information to the second terminal 30, the gateway 10, and others in the immediate vicinity. At this time, based on the routing protocol, the routing processing unit 220 transmits its own updated routing table together with the vehicle information to a different first terminal 20, the gateway 10, the roadside unit 40, and others. As a result, respective routing tables of the first terminal 20, the gateway 10, the roadside unit 40, and others are updated based on its own updated routing table. Thus, the routing processing unit 220 performs a communication process in line with the routing table updated based on travel information.

The communication state setting unit 230 sets a state to coincide with timing set based on the received vehicle information, where data can be transmitted and received to and from the second terminal 30 or the gateway 10.

Figure 8:
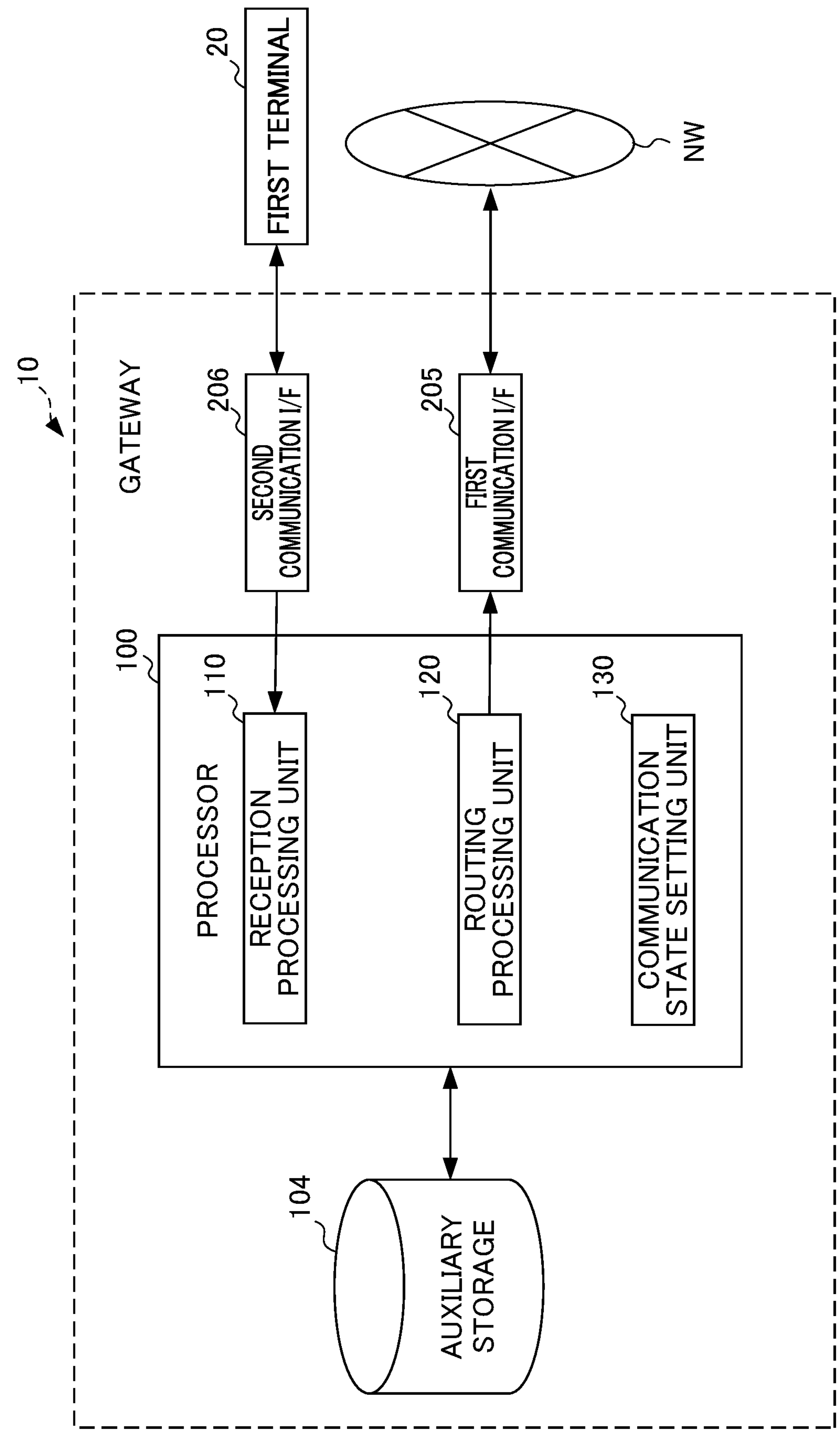
FIG. 8 is a functional block diagram of the gateway according to an embodiment of the present invention.

The following describes a functional configuration of the gateway 10 to make communication system 1 perform the handover process for the vehicle 6. FIG. 8 is a functional block diagram showing a part of the functional configuration of the gateway 10.

The processor 100 responsible for various controls over the gateway 10 includes a reception processing unit 110, a routing processing unit 120, and a communication state setting unit 130.

The reception processing unit 110 performs a process receiving a routing table containing a communication-intended roadside unit is registered as a destination, and vehicle information that are transmitted from the roadside unit 40 through the first terminal 20.

The routing processing unit 120 is implemented by software on the gateway 10. The routing processing unit 120 updates a routing table belonging to the routing processing unit 120 itself using the routing table received by the reception processing unit 110. Specifically, the routing processing unit 120 makes an update to a routing table containing an address of the communication-intended roadside unit registered as a destination address.

The routing processing unit 120 performs a process of transmitting the vehicle information to the first terminal 20, the network communication grid NW, and others in the immediate vicinity. At this time, based on the routing protocol, the routing processing unit 120 transmits its own updated routing table together with the vehicle information to the first terminal 20, the network communication grid NW, and others. As a result, respective routing tables of the first terminal 20, the network communication grid NW, and others are updated based on its own updated routing table. Thus, the routing processing unit 120 performs a communication process in line with the routing table updated based on the travel information.

The communication state setting unit 130 sets a state to coincide with timing set from vehicle information received, where data can be transmitted and received, to and from the first terminal 20 or the network communication grid NW.

Figure 9:
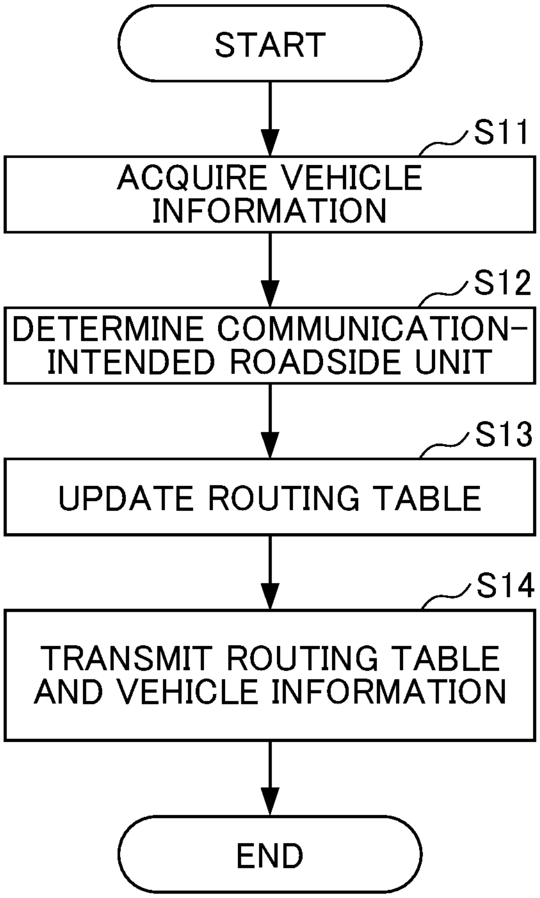
FIG. 9 is a flowchart showing an example of a process flow followed by the roadside unit making radio communication with the vehicle in the communication system according to an embodiment of the present invention.
Figure 10:
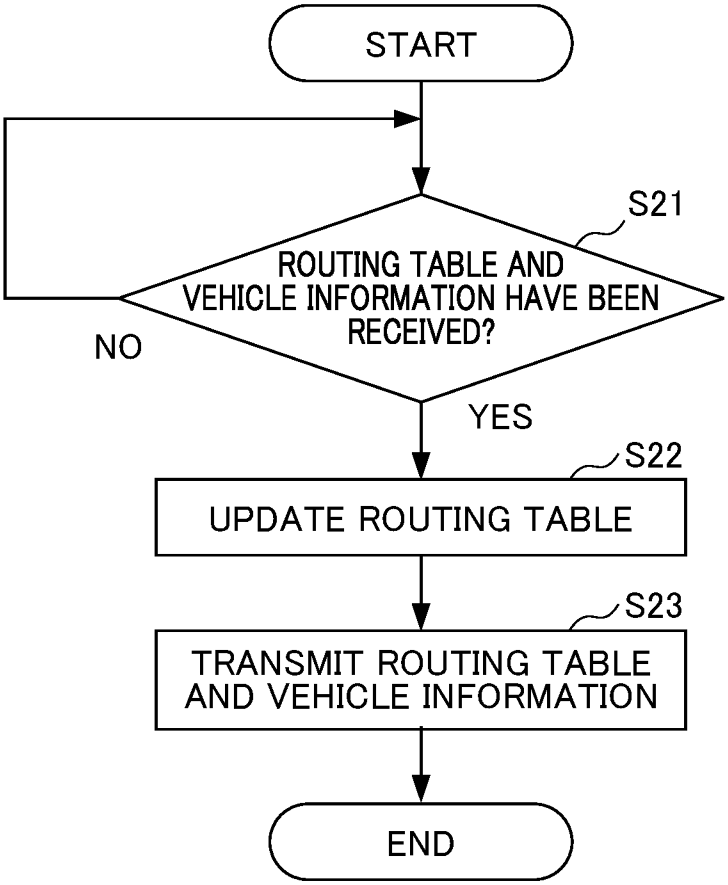
FIG. 10 is a flowchart showing an example of a process flow followed by the first terminal in the communication system according to an embodiment of the present invention.
Figure 11:
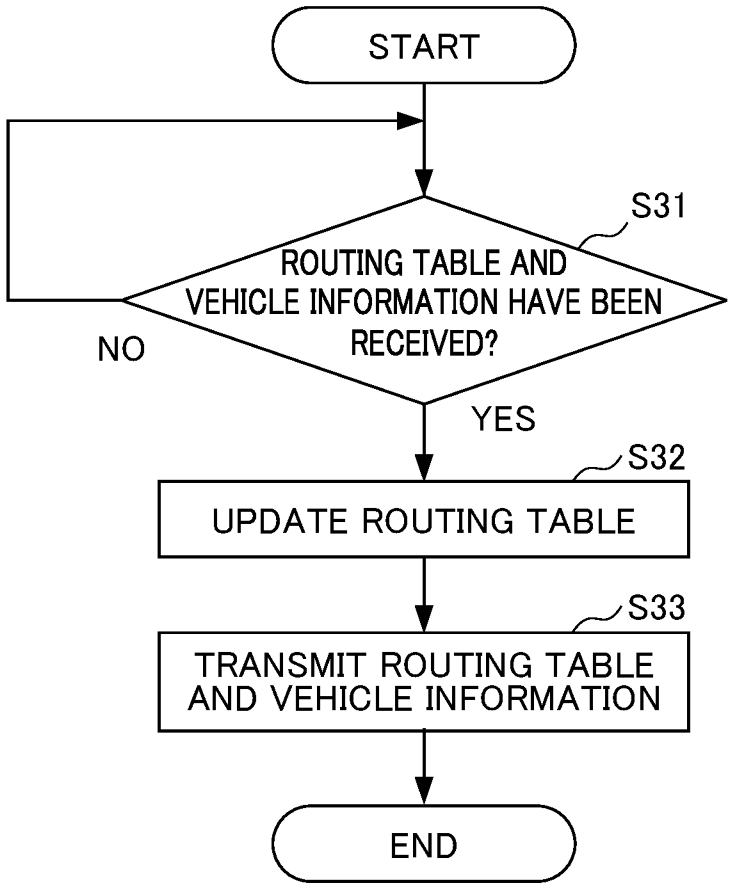
FIG. 11 is a flowchart showing an example of a process flow followed by the gateway in the communication system according to an embodiment of the present invention.
Figure 12:
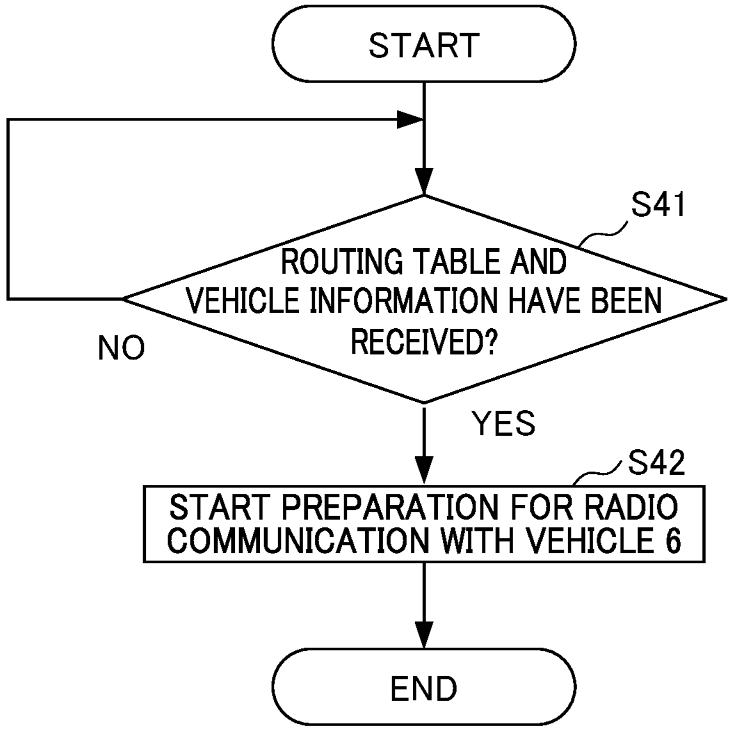
FIG. 12 is a flowchart showing an example of a process flow followed by the roadside unit determined to be a communication-intended roadside unit in the communication system according to an embodiment of the present invention.

The following describes a flow of the handover process performed by the communication system 1 according to the present embodiment by referring to FIGS. 9 to 12. In the following description of behavior, the substance of the process is given as an example and various processes capable of obtaining comparable result are applicable as appropriate. FIG. 9 is a flowchart showing an example of a process performed by the roadside unit 40 making radio communication with the vehicle 6. The processor 400 performs the process in FIG. 9 using a program stored in the ROM 402 or the auxiliary storage 404, for example. FIG. 10 is a flowchart showing an example of a process performed by the processor 200 of the first terminal 20. The processor 200 performs the process in FIG. 10 using a program stored in the ROM 202 or the auxiliary storage 204, for example. FIG. 11 is a flowchart showing an example of a process performed by the processor 100 of the gateway 10. The processor 100 performs the process in FIG. 11 using a program stored in the ROM 102 or the auxiliary storage 104, for example. FIG. 12 is a flowchart showing an example of a process performed by the processor 400 of the roadside unit 40 determined to be a communication-intended roadside unit before a vehicle enters the communicable area A. The processor 400 performs the process in FIG. 12 using a program stored in the ROM 402 or the auxiliary storage 404, for example.

As shown in FIG. 9, the reception processing unit 410 of the processor 400 acquires vehicle information through radio communication from the vehicle 6 traveling in the communicable area A communicable with the roadside unit 40 (step S11). Specifically, the reception processing unit 410 acquires travel information including positional information, velocity information, destination information, information about a traveling-intended path, and steering information, and acquires identification information about the vehicle 6 such as an MAC address, IPv6 or license plate information of the on-board device 60 from the on-board device 60 on the vehicle 6.

The roadside unit prediction unit 420 predicts a communication-intended roadside unit based on the vehicle information acquired in step S11 and positional information about the roadside unit 40 in the communication system 1 stored, for example, in the auxiliary storage 404 (step S12). If the route-set vehicle determination unit 430 determines that the vehicle 6 with which radio communication is established, is a route-set vehicle, the roadside unit prediction unit 420 predicts all roadside units 40 installed on an intended path through which the vehicle 6 is to pass before arriving at its destination registered with the vehicle 6, and determines these roadside units 40 to be communication-intended roadside units.

The routing processing unit 440 updates the routing table belonging to the routing processing unit 440 itself based on results of the prediction about the communication-intended roadside unit predicted in step S12 (step S13). Specifically, the routing processing unit 440 performs a process such as adding an address of the communication-intended roadside unit predicted in step S12 as a destination address to the routing table.

The routing processing unit 440 transmits the updated routing table and the vehicle information to the second terminal 30 (step S14).

The process performed by the first terminal 20 will be described next.

As shown in FIG. 10, the processor 200 of the first terminal 20 determines whether the routing table and the vehicle information transmitted from the roadside unit 40 through the second terminal 30, in step S14, have been received (step S21). If the processor 200 determines that the routing table and the vehicle information have been received by the reception processing unit 210 (step S21: Yes), the processor 200 moves to a process in step S22. Meanwhile, if the processor 200 determines that the routing table and the vehicle information have not been received (step S21: No), the processor 200 repeats the same process.

The routing processing unit 220 updates a routing table belonging to the routing processing unit 220 itself using the routing table received by the reception processing unit 210 (step S22).

The routing processing unit 220 transmits the routing table updated in step S22 and the vehicle information to the second terminal 30, the gateway 10, and others in the immediate vicinity of the first terminal 20 (step S23).

The process performed by the gateway 10 will be described next.

As shown in FIG. 11, the processor 100 of the gateway 10 determines whether the routing table and the vehicle information transmitted from the first terminal 20 through the PON access system 50 in step S23 have been received (step S31). If the processor 100 determines that the routing table and the vehicle information have been received by the reception processing unit 110 (step S31: Yes), the processor 100 moves to a process in step S32. Meanwhile, if the processor 100 determines that the routing table and the vehicle information have not been received (step S31: No), the processor 100 repeats the same process.

The routing processing unit 120 updates a routing table belonging to the routing processing unit 120 itself using the routing table received by the reception processing unit 110 (step S32).

The routing processing unit 120 transmits the routing table updated in step S32 and the vehicle information to the first terminal 20 and others in the immediate vicinity the gateway 10 (step S33).

The following describes the process performed by the roadside unit 40 determined to be a communication-intended roadside unit before vehicle 6 enters the communicable area A.

As shown in FIG. 12, the processor 400 of the roadside unit 40 determines whether a routing table containing its own address registered as the destination, and vehicle information acquired by a different roadside unit 40 have been received (step S41). If the processor 400 determines that the routing table containing its own address registered as a destination and the vehicle information acquired by the different roadside unit 40 have been received by the reception processing unit 410 (step S41: Yes), the processor 400 moves to a process in step S42. Otherwise, if the processor 400 determines that the above-described routing table and vehicle information have not been received (step S41: No), the processor 400 repeats the same process.

From the vehicle information received in step S41, the communication state setting unit 450 of the roadside unit 40 starts a process for making radio communication with vehicle 6 intended to travel in the communicable area A communicable with the roadside unit 40 (step S42). Specifically, to coincide with the timing set based on the vehicle information received in step S41, the communication state setting unit 450 allocates radio resources for the roadside unit 40 to vehicle 6 and controls a connection state for communication between the roadside unit 40 and the PON access system 50, for example, before the vehicle 6 enters the communicable area A. Thus, to coincide with timing set based on the travel information, the roadside unit 40 allocates radio resources to vehicle 6 and sets a state where the roadside unit 40 is communicable with the first terminal 20 before vehicle 6 enters the communicable area A, if the roadside unit 40 itself is predicted to be the roadside unit 40 installed in an area where vehicle 6 is predicted to travel. After implementation of the process in step S42, the handover process performed by the roadside unit 40 determined to be the communication-intended roadside unit is finished.

The above-described embodiment achieves the following effects.

The communication system 1 according to the present embodiment includes: the plurality of roadside units 40 installed in respective areas that acquires travel information about vehicle 6 through radio communication; and the first terminal 20 to which the plurality of roadside units 40 is connected. The roadside units 40 and the first terminal 20 each include the routing processing unit 220, 440 implemented by software. The routing processing unit 220, 440 performs a communication process in line with a routing table updated based on the travel information.

As described above, the communication process is performed in line with the routing table updated based on the travel information to update the respective routing tables of the roadside unit 40 and the first terminal 20 in the communication system 1. Thus, it is possible to share the travel information about vehicle 6 within a network, and to set in advance for a different roadside unit 40, installed in an area where vehicle 6 is predicted to travel, to communicate with vehicle 6. It is also possible to determine a flexible communication path P2 extending across different network zones. Therefore, connection setup for a predicted roadside unit to communicate with a vehicle can be done in advance, independent of network topology, allowing radio resources to be smoothly allocated in advance to the vehicle. Moreover, routing is performed using the v router as software. This reduces costs for installation of infrastructure and facilitates easier maintenance and management of the infrastructure.

In the communication system 1 according to the present embodiment, the routing processing unit 220, 440 predicts the roadside unit 40 belonging to the plurality of roadside units 40 and set in an intended area where vehicle 6 is predicted to travel based on the travel information, and updates the routing table from this prediction.

This allows this determination of the communication path P2 between the roadside unit 40 predicted to be a unit with which the vehicle 6 is to communicate in the future and the first terminal 20. As a result, it is possible to set a connection state for the determined communication path P2, and allocate radio resources to vehicle 6 in advance.

In the communication system 1 according to the present embodiment, the roadside unit 40 further includes the communication state setting unit 450. To coincide with timing based on the travel information, the communication state setting unit 450 allocates radio resources to vehicle 6 and sets a state where the roadside unit 40 is communicable with the first terminal 20 before the vehicle 6 enters the communicable area A if the roadside unit 40 itself is predicted to be the roadside unit 40 installed in the intended area.

As a result, it is possible to perform the handover process smoothly.

In the communication system 1 according to the present embodiment, the travel information includes positional information, velocity information, destination information, and steering information about the vehicle 6.

As a result, it is possible to more correctly predict an area where the vehicle 6 is predicted to travel.

In the communication system 1 according to the present embodiment, the communication system 1 further includes a plurality of the second terminals 30 (ONUs) connected to the first terminal 20, and the first terminal 20 is an OLT and provides the PON access system 50 together with a plurality of the second terminals 30.

This provides connection of the plurality of roadside units 40 collectively to one first terminal 20 through the second terminal 30, making it possible to reduce costs for placement of the line L formed of an optical fiber, for example. Furthermore, as the PON access system 50 provides connection of the plurality of roadside units 40 to one first terminal 20, signals flowing through the optical fiber are more likely to collide with each other. This can be handled by allocation of radio resources for the roadside unit 40 to the vehicle 6, setting of a connection state along the communication path in advance, and others. By doing so, it is possible to reduce costs further for infrastructure installation and to perform the handover process smoothly.

In the communication system 1 according to the present embodiment, the roadside unit 40 acquires identification information about vehicle 6 and determines based on the identification information whether the vehicle 6 is a route-set vehicle which a destination is predetermined. If vehicle 6 is determined to be a route-set vehicle, the roadside unit 40 predicts two or more of the plurality of roadside units 40 installed in an intended area where the vehicle 6 is predicted to travel before arriving at the destination of the route-set vehicle, and sets the communication path P2 between each of the two or more predicted roadside units 40 and the first terminal 20 by updating the routing table based on the prediction.

With such a configuration, it is possible to collectively make predictions for the plurality of roadside units 40 to be passed through before arriving at the destination, so that cost for the processing can be reduced.

A communication method according to the present embodiment is executed by the communication system 1 including the plurality of roadside units 40 installed in respective areas, and the first terminal 20 to which the plurality of roadside units 40 is connected. The method includes: a travel information acquisition step of acquiring travel information about vehicle 6 through radio communication; and a communication processing step that causes the routing processing unit 220, 440, implemented by software, on each of the roadside units 40 and the first terminal 20, to perform a communication process in line with a routing table updated based on the travel information.

As described above, the communication process is performed in line with the routing table updated based on the travel information to update the respective routing tables of the roadside unit 40 and the first terminal 20 in the communication system 1. Thus, it is possible to share the travel information about the vehicle 6 within a network, and to set in advance for a different roadside unit 40 installed in an area where vehicle 6 is predicted to travel to communicate with the vehicle 6. It is also possible to determine a flexible communication path P2 extending across different zones of the network. By doing so, connection setting for a predicted roadside unit to communicate with a vehicle can be made in advance, independently of network topology, allowing radio resources to be smoothly allocated in advance to the vehicle. Moreover, routing is performed using the v router software. This reduces the infrastructure installation costs and facilitates easier maintenance and management of the infrastructure.

A non-transitory computer-readable storage medium storing a program according to the present embodiment causes a computer incorporated in the communication system 1 to execute a function. The communication system 1 includes the plurality of roadside units 40 installed in respective areas, and the first terminal 20 to which the plurality of roadside units 40 is connected. The function includes: a travel information acquisition function of acquiring travel information of vehicle 6 through radio communication; and a communication processing function that causes the routing processing unit 440,220 implemented by software on each of the roadside units 40 and the first terminal 20 to perform a communication process in line with a routing table updated based on the travel information.

As described above, the communication process is performed in line with the routing table updated based on the travel information to update the respective routing tables of the roadside unit 40 and the first terminal 20 in the communication system 1. Thus, it is possible to share the travel information about the vehicle 6 within a network and to set in advance for a different roadside unit 40 installed in an area where the vehicle 6 is predicted to travel to communicate with vehicle 6. It is also possible to determine a flexible communication path P2 extending across different zones of the network. By doing so, connection setting for a predicted roadside unit to communicate with a vehicle can be made in advance, independently of a network topology, allowing radio resources to be smoothly allocated in advance to the vehicle. Moreover, routing is performed using the v router software. This reduces the infrastructure installation costs, and facilitates maintenance and management of the infrastructure.

While the embodiment of the present invention has been described above, the present invention is not limited to the above-described embodiment but can be changed, as appropriate.

In the above-described embodiment, the communication system 1 has a point-to-multipoint (P2MP) network communication grid such as the PON access system 50 formed between the plurality of roadside units 40 and the network communication grid NW. However, the communication system 1 may have a plurality of network topologies such as a point-to-point (P2P) network communication grid and a ring network other than the PON access system 50. Alternatively, the communication system 1 may include a unit such as a layer 2 switch (L2SW) other than the PON access system 50.

In the above-described embodiment, only the roadside unit 40 includes the roadside unit prediction unit 420. Instead of the roadside unit 40, however, the gateway 10 or the first terminal 20 may predict a communication-intended roadside unit based on travel information about vehicle 6 and update a routing table belonging to the gateway 10, or the first terminal 20 itself based on results of the prediction. In another configuration, at least one of the gateway 10, the first terminal 20, and the roadside unit 40 may include a roadside unit prediction unit.

As an example, the communication system 1 may have a configuration including a server connected to the first terminal 20 through the network communication grid NW and the gateway 10. In this case, the server may be given a function as an SND controller, and the server may execute control as a control plane to manage communication through the gateway 10, the first terminal 20, and the roadside unit 40. Thus, the server may be configured to determine a content in a routing table based on the travel information about the vehicle 6, and the gateway 10, the first terminal 20, or the roadside unit 40 may be configured to update its own routing table based on the routing table determined by the server and transfer the updated routing table. As another example, the gateway 10 may be given a function as an SND controller and may execute control as a control plane to manage communication through the first terminal 20 and the roadside unit 40. As another example, the first terminal 20 may be given a function as an SND controller and may execute control as a control plane to manage communication through the gateway 10 and the roadside unit 40. As another example, the roadside unit 40 may be given a function as an SND controller and may execute control as a control plane to manage communication through the gateway 10 and the first terminal 20. By doing so, it becomes unnecessary to set each communication device individually to facilitate management of the communication system 1 as a whole.

As an example, the roadside unit 40 may have a configuration without the route-set vehicle determination unit 430.

EXPLANATION OF REFERENCE NUMERALS

1 Communication system
6 Vehicle
20 First terminal (terminal)
40 Roadside unit
120, 220, 440 Routing processing unit
200 Processor
400 Processor

What is claimed is:

1. A communication system, comprising:

a plurality of roadside units installed in respective areas that acquires travel information about a vehicle through radio communication; and a terminal to which the plurality of roadside units is connected, the roadside units and the terminal each including a routing processing unit implemented by software, the routing processing unit performing a communication process in line with a routing table updated based on the travel information, wherein the routing processing unit predicts the roadside unit belonging to the plurality of roadside units and set in an intended area where the vehicle is predicted to travel based on the travel information, and updates the routing table based on results of the prediction, wherein the roadside unit further includes a communication state setting unit, and, to coincide with timing set based on the travel information, the communication state setting unit allocates radio resources to the vehicle and sets a state where the roadside unit is communicable with the terminal before the vehicle enters a communicable area communicable with the vehicle if the roadside unit itself is predicted to be the roadside unit set in the intended area.

2. The communication system according to claim 1, wherein the travel information includes positional information, velocity information, destination information, and steering information about the vehicle.

3. The communication system according to claim 1, further comprising: a plurality of ONUs connected to the terminal, wherein the terminal is an OLT and provides a PON access system together with a plurality of the ONUs.

4. The communication system according to claim 3, wherein the plurality of ONUs is each connected to a respective roadside unit of the plurality of roadside units.

5. The communication system according to claim 4, wherein the plurality of ONUs are connected to the OLT via an optical fiber.

6. The communication system according to claim 1, wherein the roadside unit acquires identification information about the vehicle and determines based on the identification information whether the vehicle is a route-set vehicle for which a destination is determined in advance, and if the vehicle is determined to be the route-set vehicle, the roadside unit predicts two or more of the plurality of roadside units installed in an intended area where the vehicle is to pass through before arriving at the destination of the route-set vehicle, and sets a communication path between each of the two or more predicted roadside units and the terminal by updating the routing table based on the prediction.

7. The communication system according to claim 1, wherein the communicable area is of the roadside unit.

8. A communication method executed by a communication system including a plurality of roadside units installed in respective areas, and a terminal to which the plurality of roadside units is connected, the method comprising:

a travel information acquisition step of acquiring travel information about a vehicle through radio communication; and a communication processing step of causing a routing processing unit, implemented by software, on each of the roadside units and the terminal to perform a communication process in line with a routing table updated based on the travel information, wherein the routing processing unit predicts the roadside unit belonging to the plurality of roadside units and set in an intended area where the vehicle is predicted to travel based on the travel information, and updates the routing table based on results of the prediction, wherein the roadside unit further includes a communication state setting unit, and, to coincide with timing set based on the travel information, the communication state setting unit allocates radio resources to the vehicle and sets a state where the roadside unit is communicable with the terminal before the vehicle enters a communicable area communicable with the vehicle if the roadside unit itself is predicted to be the roadside unit set in the intended area.

9. A non-transitory computer-readable storage medium, storing a program that causes a computer incorporated in a communication system to execute a function, the communication system including a plurality of roadside units installed in respective areas, and a terminal to which the plurality of roadside units is connected, the function comprising:

a travel information acquisition function of acquiring travel information about the vehicle through radio communication; and a communication processing function of causing a routing processing unit implemented by software on each of the roadside units and the terminal to perform a communication process in line with a routing table updated based on the travel information, wherein the routing processing unit predicts the roadside unit belonging to the plurality of roadside units and set in an intended area where the vehicle is predicted to travel based on the travel information, and updates the routing table based on results of the prediction, wherein the roadside unit further includes a communication state setting unit, and, to coincide with timing set based on the travel information, the communication state setting unit allocates radio resources to the vehicle and sets a state where the roadside unit is communicable with the terminal before the vehicle enters a communicable area communicable with the vehicle if the roadside unit itself is predicted to be the roadside unit set in the intended area.

* * * * *